US008265688B2

(12) United States Patent  
Hamadene et al.

(10) Patent No.: US 8,265,688 B2
(45) Date of Patent: Sep. 11, 2012

(54) WIRELESS COMMUNICATION DEVICE AND SPLIT TOUCH SENSITIVE USER INPUT SURFACE

(75) Inventors: Hafid Hamadene, Forest Park, IL (US); Roger J. Jellicoe, Woodstock, IL (US); Donald W Zerrien, Palatine, IL (US); Lawrence John Chapa, Libertyville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 474 days.

(21) Appl. No.: 12/343,264

(22) Filed: Dec. 23, 2008

(65) Prior Publication Data

US 2009/0325643 A1 Dec. 31, 2009

Related U.S. Application Data

(60) Provisional application No. 61/018,245, filed on Dec. 31, 2007.

(51) Int. Cl.  
*H04M 1/00* (2006.01)

(52) U.S. Cl. ..................... 455/550.1; 455/556

(58) Field of Classification Search ............... 455/550.1, 455/556, 411, 103, 567, 550, 562, 403; 345/173, 345/156, 157, 169; 715/702  
See application file for complete search history.

(56) References Cited

U.S. PATENT DOCUMENTS

| 5,543,588 | A | 8/1996 | Bisset et al. |
| 5,729,219 | A | 3/1998 | Armstrong et al. |
| 5,896,575 | A | 4/1999 | Higginbotham et al. |
| 5,959,260 | A | 9/1999 | Hoghooghi et al. |
| 6,335,725 | B1 | 1/2002 | Koh et al. |
| 6,346,935 | B1 * | 2/2002 | Nakajima et al. ............. 345/173 |
| 6,492,979 | B1 | 12/2002 | Kent et al. |
| 6,504,530 | B1 | 1/2003 | Wilson et al. |
| 6,927,747 | B2 | 8/2005 | Amirzadeh et al. |

(Continued)

FOREIGN PATENT DOCUMENTS

JP 05-324122 A 12/1993

(Continued)

OTHER PUBLICATIONS

PCT/US2008/088372, PCT Search Report and Written Opinion, Dated Jul. 31, 2009.

(Continued)

*Primary Examiner* — Joseph Lauture

(57) ABSTRACT

The present invention provides a hand-held device including a split touch sensitive input surface, the touch sensitive input surface including a first touch sensitive array, which has a position sensor adapted for detecting a relative position of a first pointer device, and a second touch sensitive array which has a position sensor adapted for detecting a relative position of a second pointer device. The second touch sensitive array is separate from the first touch sensitive array and is located on a common side with the first touch sensitive array. The hand-held device further includes a display visible from an exterior surface of the device, which is different from the exterior side interface surface where the first touch sensitive array and the second touch sensitive array are located, where the current relative position of an end of a respective pointer interacting with each of the first touch sensitive array and the second touch sensitive array are illustrated on respective display areas of the display by a display controller coupled to the first touch sensitive array, the second touch sensitive array, and the display.

17 Claims, 3 Drawing Sheets

U.S. PATENT DOCUMENTS

| | | | |
|---|---|---|---|
| 7,075,513 | B2 | 7/2006 | Silfverberg et al. |
| 7,123,243 | B2 | 10/2006 | Kawasaki et al. |
| 7,205,959 | B2 | 4/2007 | Henriksson |
| 7,466,294 | B2 | 12/2008 | Yamazaki et al. |
| 7,622,863 | B2 | 11/2009 | Seo et al. |
| 2003/0184528 | A1 | 10/2003 | Kawasaki et al. |
| 2004/0169624 | A1 | 9/2004 | Yamazaki et al. |
| 2004/0263056 | A1 | 12/2004 | Seo et al. |
| 2005/0024339 | A1 | 2/2005 | Yamazaki et al. |
| 2006/0092355 | A1 | 5/2006 | Yang et al. |
| 2006/0197750 | A1 | 9/2006 | Kerr et al. |
| 2006/0197753 | A1 | 9/2006 | Hotelling |
| 2006/0284853 | A1 | 12/2006 | Shapiro |
| 2007/0075915 | A1 | 4/2007 | Cheon et al. |
| 2007/0103454 | A1 | 5/2007 | Elias |
| 2007/0177803 | A1 | 8/2007 | Elias et al. |
| 2008/0211783 | A1 | 9/2008 | Hotelling et al. |
| 2009/0298547 | A1 | 12/2009 | Kim et al. |
| 2009/0315834 | A1 | 12/2009 | Nurmi et al. |
| 2010/0277420 | A1 | 11/2010 | Charlier et al. |
| 2010/0277421 | A1 | 11/2010 | Charlier et al. |
| 2010/0277439 | A1 | 11/2010 | Charlier et al. |

FOREIGN PATENT DOCUMENTS

| | | | |
|---|---|---|---|
| JP | 2001184160 | A | 7/2001 |
| JP | 2005049978 | A | 2/2005 |
| JP | 2006221268 | A | 8/2006 |
| WO | 9838822 | A1 | 9/1998 |
| WO | 0208881 | A2 | 1/2002 |
| WO | 2008030563 | A2 | 3/2008 |
| WO | 2009088808 | A2 | 7/2009 |

OTHER PUBLICATIONS

PCT Search Report, PCT Application No. PCT/US2008/088362; Motorola; Oct. 8, 2009; 12 pages.

Erh-Li (Early) Shen et al, "Double-Side Multi-Touch Input for Mobile Device", CHI 2009—Digital Life, New World; conference Proceedings and Extended Abstracts; The 27th Annual CHI Conference on Human Factors in Computing Systems, Apr. 4-9, 2009, Boston, USA, ACM Association for Computing Machinery, US Apr. 4, 2009, pp. 4339-4344.

Danile Wigdor, et al: "Lucid Touch: A See-Through Mobile Device", UIST 2007, Proceedings of the 20th Annual ACM Symposium on User Interface Software and Technology, Oct. 7-10, 2007, Newport, Rhode Island, USA: [ACM Symposium on User Interface Software and Technology], New York, NY: ACM, US Oct. 7, 2007, pp. 269-278.

Arranz, Jose: "The International Search Report and the Written Opinion of the International Searching Authority", European Patent Office, Rijswijk, completed: Jul. 1, 2010, mailed: Jul. 7, 2010, all pages.

United States Patent and Trademark Office, "Non-Final Office Action Summary" Jul. 25, 2011, pp. 1-30, U.S. Appl. No.12/343,259.

Patent Cooperation Treaty, "PCT Search Report and Written Opinion of the International Searching Authority" for International Application No. PCT/US2010/031859, Dec. 6, 2010, 8 pages.

Patent Cooperation Treaty, "PCT Search Report and Written Opinion of the International Searching Authority" for International Application No. PCT/US2010/031871, Dec. 6, 2010, 8 pages.

United States Patent and Trademark Office, "Non-Final Office Action Summary", Oct. 6, 2011, 42 pages, U.S. Appl. No. 12/433,275.

Patent Cooperation Treaty, "PCT Search Report and Written Opinion of the International Searching Authority" for International Application No. PCT/US2010/031879, Jul. 7, 2010, 14 pages.

United States Patent and Trademark Office, "Final Rejection"for U.S. Appl. No. 12/433,253 dated Feb. 16, 2012, 29 pages.

The State of Intellectual Property Office of the People's Republic of China, "Notification of the First Office Action", for Chinese Pat. Appln. No. 200880123481.8, Nov. 25, 2011, 4 pages.

* cited by examiner

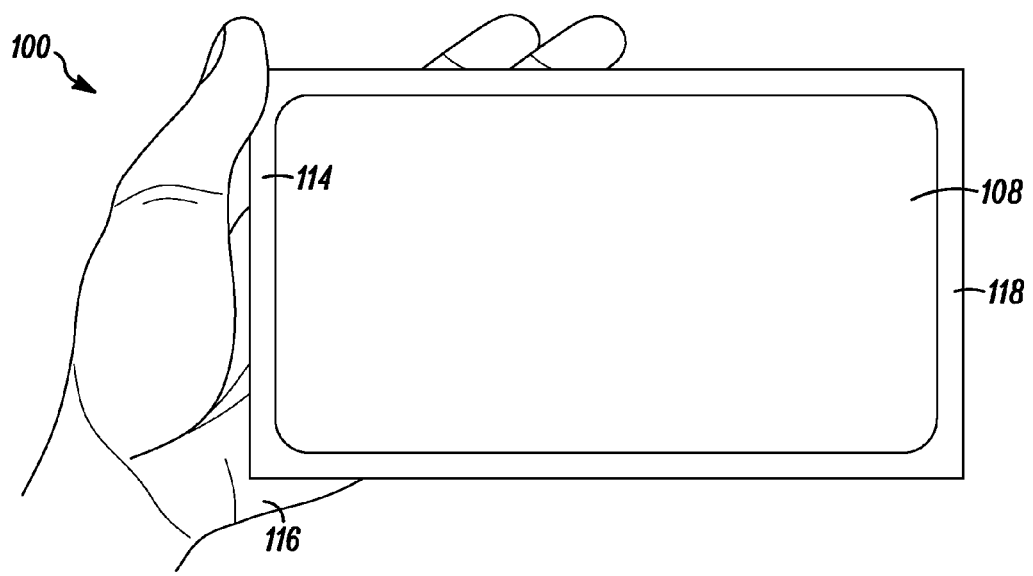
FIG. 1
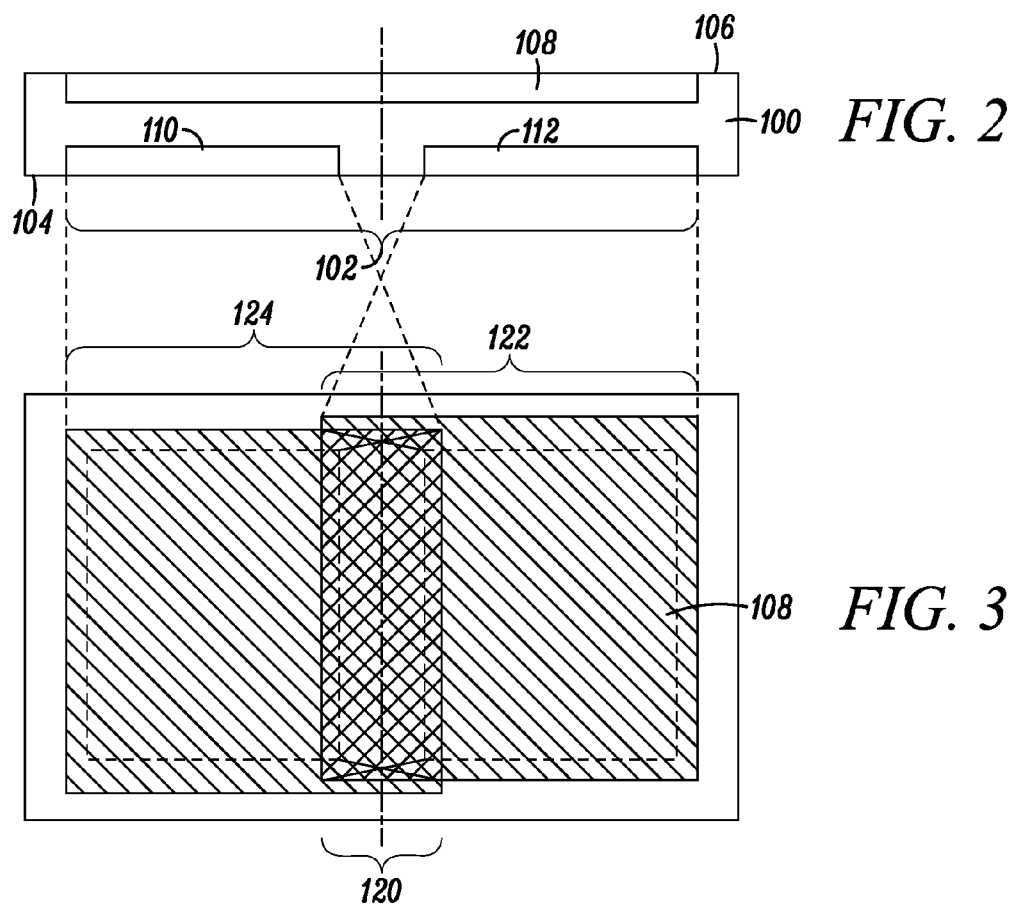
FIG. 2
FIG. 3

WIRELESS COMMUNICATION DEVICE AND SPLIT TOUCH SENSITIVE USER INPUT SURFACE

FIELD OF THE INVENTION

The present invention relates generally to a device and a method for supplying a user input to a hand-held device, and more particularly, to a split touch sensitive input surface having a pair of separate touch sensitive arrays, located on a common side, each adapted for detecting a relative position of a pointer device proximate the respective array.

BACKGROUND OF THE INVENTION

Devices are increasingly incorporating multiple types of functionality, each having varying types of controls. Touch sensitive input panels are similarly being more widely implemented to support a user's interaction with many types of hand-held devices relative to at least some of the multiple types of incorporated functionality. In order to maximize screen size, while limiting the overall dimension of the device, many of these devices incorporate the touch sensitive panels in conjunction with a display, where the user interaction with the touch panel is supported with visual prompts and feedback, and/or the user interacts with elements being displayed on the screen. However many implementations of touch sensitive panels, used in conjunction with a display involve a user interacting with the touch sensitive panels, which can obstruct at least partially the user's view of the screen, and the elements on the screen with which the user is attempting to interact. Furthermore, interaction with the display with one's fingers can often leave smudges, which while they do not generally affect the operation of the device, can sometimes affect the appearance of the device, and may also impact the perceived image quality.

Some devices have attempted to relocate the touch sensitive input panel on the back side of the device, in order to avoid some of the downside associated with interacting with the device using the same surface shared with the display. However, in some implementations it is not always clear which elements on the screen that the user might be engaging. Some embodiments, have attempted to compensate, by superimposing a visual representation of the current position of the pointing device such as a finger, relative to the touch sensitive input panel and correspondingly the display, as it slides across the touch sensitive input panel located on the rear of the device. This generally requires that the finger remain in relative proximity to the back of the device, while being tracked which might limit the available interactions for other activities.

Furthermore, many types of touch sensitive input panel implementations are limited to providing a single location value associated with interacting with the input panel regardless as to whether a single position or multiple positions on the input panel are being engaged. In some instances, when multiple positions are simultaneously engaged, an averaging of the actual positions may be reported to an input controller, which in some circumstances may be misleading and/or misinterpreted by the device. As a result, it may be difficult to track the position of multiple pointing objects, such as a user's multiple fingers, and/or the use of multiple pointing objects, which whether intentional or not, may affect the accuracy of the reported position.

Consequently, the present inventors have recognized that it would be beneficial if a split touch sensitive input surface was implemented that enables the detection of two simultaneous inputs, and which readily enables a user to interact with a device through a touch sensitive surface on the back surface (i.e. opposite the display) of the device.

SUMMARY OF THE INVENTION

The present invention provides a hand-held device including a split touch sensitive input surface, the touch sensitive input surface including a first touch sensitive array, which has a position sensor adapted for detecting a relative position of a first pointer device, and a second touch sensitive array which has a position sensor adapted for detecting a relative position of a second pointer device. The second touch sensitive array is separate from the first touch sensitive array and is located on a common side with the first touch sensitive array. The hand-held device further includes a display visible from an exterior surface of the device, which is different from the exterior side interface surface where the first touch sensitive array and the second touch sensitive array are located, where the current relative position of an end of a respective pointer interacting with each of the first touch sensitive array and the second touch sensitive array are illustrated on respective display areas of the display by a display controller coupled to the first touch sensitive array, the second touch sensitive array, and the display. The hand-held device further provides a portion of each of the respective display areas of the display, which overlap, thereby creating a virtual overlapping zone of interaction, that does not correspond to any actual overlapping of the first touch sensitive array relative to the second touch sensitive array but that is commonly accessible through an interaction a portion of each of the first touch sensitive array and the second touch sensitive array.

The present invention further provides a split touch sensitive input surface. The split touch sensitive input surface includes a first touch sensitive array, which has a position sensor adapted for detecting a relative position of a first pointer device, and a second touch sensitive array which has a position sensor adapted for detecting a relative position of a second pointer device. The second touch sensitive array is separate from the first touch sensitive array and is located on a common side with the first touch sensitive array. At least one of the first touch sensitive array or the second touch sensitive array includes a force sensor adapted for detecting the relative force the corresponding one of the first pointer device or the second pointer device is engaging the respective touch sensitive array.

The present invention still further provides a hand-held device including a split touch sensitive input surface, the touch sensitive input surface including a first touch sensitive array, which has a position sensor adapted for detecting a relative position of a first pointer device, and a second touch sensitive array which has a position sensor adapted for detecting a relative position of a second pointer device. The second touch sensitive array is separate from the first touch sensitive array and is located on a common side with the first touch sensitive array. The hand-held device further includes a display visible from an exterior surface of the device, which is different from the exterior side interface surface where the first touch sensitive array and the second touch sensitive array are located, where the current relative position of an end of a respective pointer interacting with each of the first touch sensitive array and the second touch sensitive array are illustrated on respective display areas of the display by a display controller coupled to the first touch sensitive array, the second touch sensitive array, and the display. The hand-held device further provides a boundary of each of the respective display areas, which corresponds to each of the first touch sensitive array and the second touch sensitive array, that can be separately mapped and adjusted to a particular portion of the display, and can have a different scaling factor.

BRIEF DESCRIPTION OF THE DRAWINGS

FIG. 1 is a front plan view of an exemplary hand-held device having a touch sensitive user interface on a surface of the device which is opposite the surface of the device including a display;

FIG. 2 is a side plan view of an exemplary hand-held device, illustrated in FIG. 1;

FIG. 3 is a front plan view mapping the split touch sensitive input surface to a display area, in accordance with one embodiment of the present invention;

DETAILED DESCRIPTION OF THE PREFERRED EMBODIMENT(S)

Figure 4:
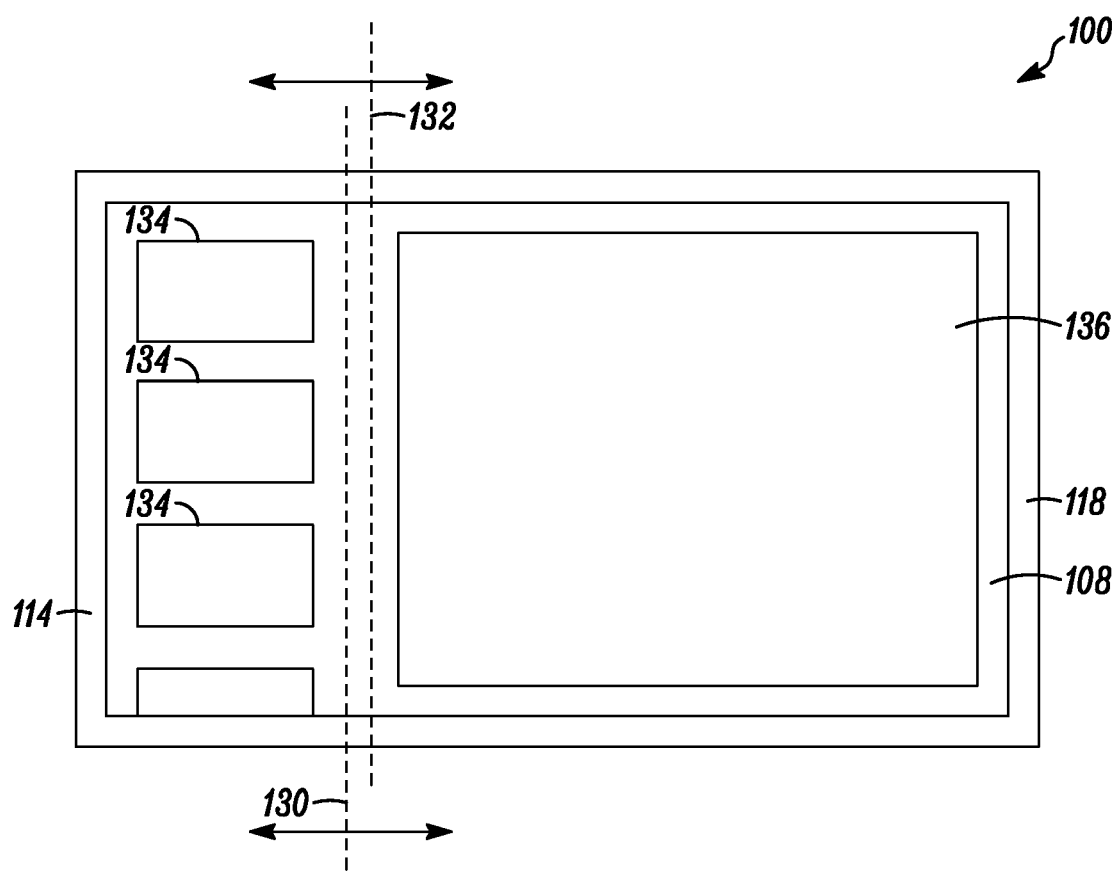
FIG. 4 is a front plan view illustrating an exemplary potentially dynamically mappable split touch sensitive input surface relative to a display area, in accordance with a further embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIGS. 1 and 2 illustrate a front and side plan view of an exemplary hand-held device 100 having a touch sensitive user interface 102 on a surface 104 of the device, which is opposite the surface 106 of the device including a display 108. The touch sensitive user interface 102 includes a first touch sensitive array 110, and a second touch sensitive array 112 separate from the first touch sensitive array 110, which each include respective position sensors, which are adapted for detecting a relative position of a corresponding pointer device relative to the touch sensitive arrays 110. The respective position sensors for each of the first touch sensitive array 110 and the second touch sensitive array 112 are arranged in each of at least a pair of directions across at least a two dimensional surface area. The first touch sensitive array 110 and the second touch sensitive array 112 are located on a common side 104.

A pointer device could include a user's finger or a stylist, or any other suitable generally elongated element having an end for identifying a particular area associated with the touch sensitive array. By including two separate arrays, two different positions can be readily separately identified, simultaneously, one associated with each of the two arrays. In FIG. 1, the device 100 is illustrated as being held by a hand 116 on at least one of the (i.e. the left) sides 114. The hand 116 typically belongs to the user of the device. In addition to being held on the left side 114, often times, the user will hold the right side 118 of the device with the other hand (i.e. right hand—not shown).

Respective ones of the two separate arrays will respectively extend from each of the left side 114 and the right side 118 and generally toward the center of the device 100 to facilitate interaction with the user via a corresponding finger from each hand. In accordance with at least some embodiments, such as the embodiment illustrated in FIG. 3, the area associated with each of the arrays 110 and 112 will correspondingly map to respective portions of the display. In some instances, even though the arrays 110 and 112 taken together may not extend the full width of the device, as part of the mapping of the array areas to corresponding display areas, a portion of each of the arrays might overlap in terms of an ability to interact and control display elements relative to a common area of the display 120. This enables elements to be handed across the boundary area between the left and right sides of the display. Generally, the right side touch sensitive array 112 is adapted to interact with displayed elements on the right side of the display 122, and the left side touch sensitive array 110 is adapted to interact with displayed elements on the left side of the display 124.

By placing the touch sensitive arrays on the side of the device opposite the display, a user can interact with the display without visually interfering with the display. However, this can sometimes make it more difficult to track the current location of a pointing device such as a finger relative to the current control point on the display 108. Correspondingly, in at least some embodiments, a visual indication will be provided as to the current detected location of interaction, relative to the display area with a displayed symbol, such as the use of a plus sign or cross hair symbol.

Generally, the touch sensitive arrays can employ various types of touch or proximity sensing technologies including capacitive arrays as well as resistive arrays, the touch sensitive arrays can even employ force sensing resistor arrays, for detecting the amount of force being applied at the selected location. In this way, a force threshold determination can be taken into account in determining the intended interaction with the elements being shown in the display. One skilled in the art will readily appreciate that other types of touch and/or proximity sensitive technology may be employed without departing from the teachings of the present invention.

While FIG. 3 illustrates the possibility of a single mapping that could be implemented in a relatively static manner for use in interacting with the displayed elements on the device, other implementations might envision a more dynamic mapping which is allowed to change, fluctuate or be modified, based upon user preferences or changing use conditions.

FIG. 4 is a front plan view illustrating an exemplary potentially dynamically mappable split touch sensitive input surfaces relative to a display area, in accordance with a further embodiment of the present invention. While the area associated with each of the touch sensitive input surface arrays 110 and 112, illustrated in FIG. 2, are generally unchanged, the corresponding mapping to respective zones or portions of the display 108 has changed. In the illustrated embodiment, the particular use application includes a portion of the display extending from the left side 114 bounded by a dashed line 130 representing a first boundary, and a portion of the display extending from the right side 118 bounded by a dashed line 132 representing a second boundary.

The portion of the display corresponding to the left side includes several thumbnail images 134 arranged vertically through which a user might scroll and select a particular thumbnail image. The portion of the display corresponding to the right side includes at least a portion of an image 136 corresponding to a selected thumbnail image, with which a user might be interacting. For example, the user may be panning or zooming the image portion and/or interacting with elements contained therein for purposes of viewing or editing the item. Upon selection of elements in the displayed portions of the right side of the screen, a list of available actions relative to the selected element may be highlighted in the left side portion of the screen, which can then be selected, dependent upon the desires of the user. This allows elements selected in one of the two display portions to affect the selection or choices available to the user in the other one of the two display portions.

The above noted thumbnail images, could be used in conjunction with the viewing or editing of multiple elements, such as a plurality of images or pictures. The same or similar thumbnail approach could similarly be used to switch between multiple files, or web pages currently opened relative to a particular application, such as a web browser or a word processor, where the thumbnails could be used for window management. It is similarly possible that the thumbnails could be representative of different windows associated with a plurality of different applications.

Because a particular display configuration may be dependent upon a particular use case, it may be beneficial for the mapping between the multiple touch sensitive input surface arrays 110 and 112, and the corresponding display portions to be adjustable. As such, it may be desirable for the user to be able to move the corresponding boundary 130 and 132 associated with each section. Arrows indicate the possibility, that the boundaries might be laterally adjusted. In some instances the corresponding placement of the boundaries might make the respective associated areas on the display distinct, as illustrated in FIG. 4, or alternatively could enable an area of overlap, as illustrated in FIG. 3.

Such boundary management might be controlled by the hand-held device through the current configuration of the user interface, and the particular application being used on the device, such as via a parameter passed by a particular application to a controller responsible for managing display functionality. In other instances, it may be possible for the user to adjust the boundary, through a suitable gesture received via a corresponding one of the touch sensitive input surface arrays.

Still further, while the corresponding display portions, defined relative to the illustrated mapping, shown in FIG. 3, is substantially equal, as shown in FIG. 4, there may be differences in size between the respective display portions. Where size differences are present, it is possible that the mapping of distances between points on the touch sensitive display relative to their corresponding interaction with particular points on the corresponding display portions may similarly have differences reflective of the size differences. In other words, each of the touch sensitive inputs may map disproportionately and/or have varying scaling relative to their respectively mapped display portions.

Figure 5:
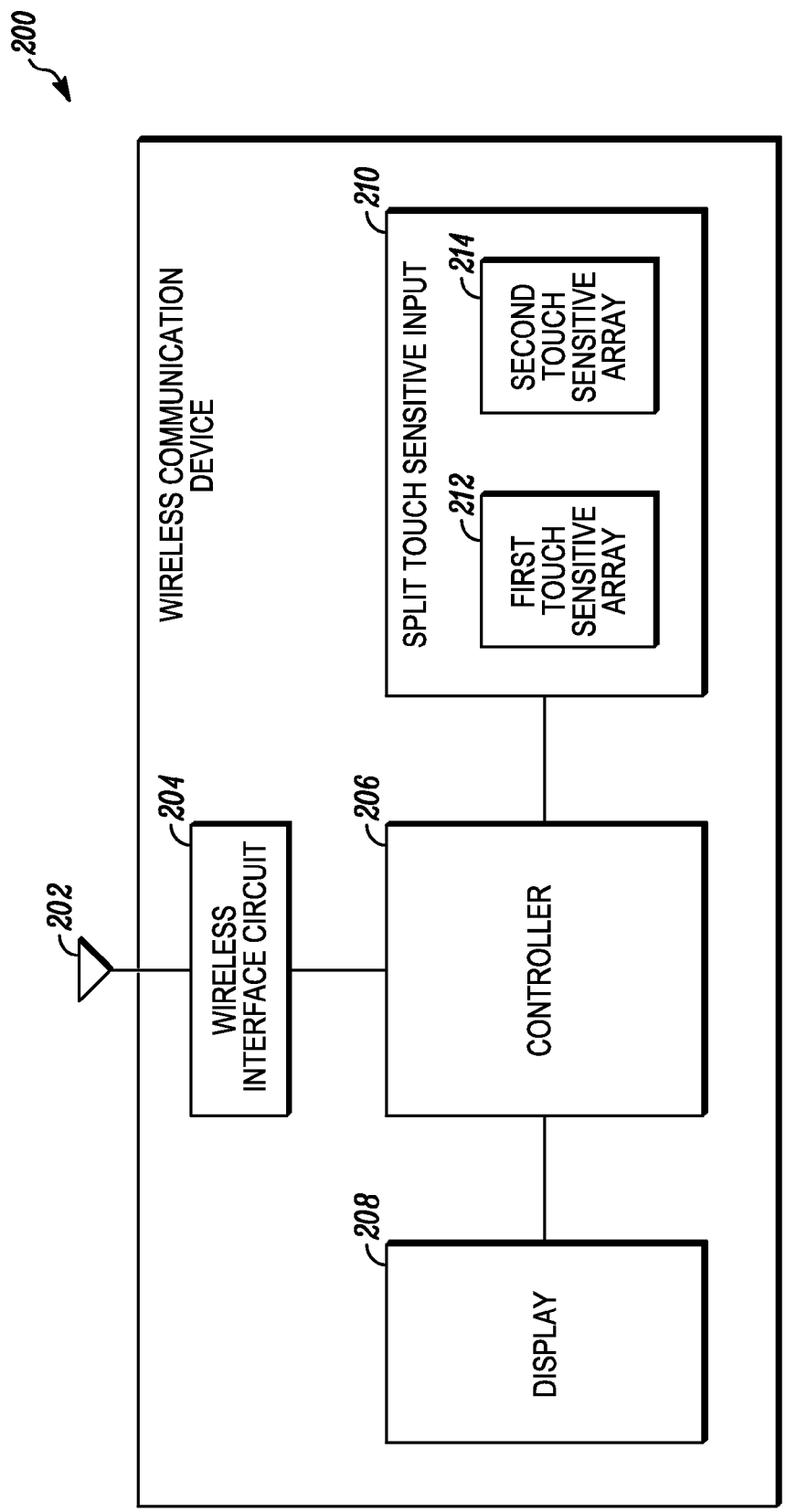
FIG. 5 is a block diagram of a wireless communication device, in accordance with at least one embodiment of the present invention.

FIG. 5 illustrates a block diagram of the split touch sensitive input surface 102, incorporated as part of an exemplary type of device, namely a wireless communication device 200. In the particular embodiment illustrated, the wireless communication device 200 includes an antenna 202 and a wireless interface circuit 204 coupled to the antenna 202. The wireless interface can include one or more of a transmitter, a receiver or a transceiver to facilitate the sending and receiving of electromagnetic energy via the antenna 202.

The wireless communication device 200 further includes a controller 206 coupled to the wireless interface circuit 204, a display 208 coupled to the controller 206, as well as a split touch sensitive input surface 210 including a first 212 and a second 214 touch sensitive array for detecting a pointing interaction between the user and the device 200. In at least some embodiments, the controller 206 can be implemented at least in part using one or more microprocessors, which might operate in conjunction with the one or more sets of prestored instructions to perform some of the functionality associated with the controller in managing the wireless communications, and/or the interaction between the split touch sensitive display 210 and the display 208. The one or more sets of prestored instructions can be stored in the corresponding microprocessor, or can be stored in one or more types of memory devices, which might be coupled to the microprocessor. Examples of various types of memories include forms of volatile and/or non-volatile memory, such as conventional ROM, EPROM, RAM, or EEPROM, as well as other forms of storage including fixed or removable discs. In some instances some or all of any memory for storing prestored instructions can be maintained separate from the device 200, for example on a server which might be communicatively coupled to the device 200.

While at least some of the functionality associated with one or more of the controllers can be managed under the direction of one or more sets of prestored instructions, one skilled in the art will readily recognize that the controller can include additional and/or alternative forms, such as sequential state machines and operational logic circuitry, which could be implemented in hardware, software and/or both. To the extent that any portion of the functionality is implemented using hardware elements, the same could be constructed using discrete logic elements, gate array or programmable logic array type structures, and/or could be implemented in a VLSI type structure, without departing from the teachings of the present invention.

While the split touch sensitive input surface 210 has been described, in at least some instances as potentially forming part of a wireless communication device 200, one skilled in the art will recognize that the split touch sensitive input surface 210 can be incorporated in other types of devices, hand-held or otherwise, for purposes of providing a multi-touch interface, without departing from the teachings of the present invention. Further examples in addition to the previously noted wireless communication devices, which might include cellular radio telephones, paging devices, and cordless telephones, without intending to be an exhaustive list, might additionally include personal digital assistants, portable computers, pen-based or keyboard-based handheld devices, remote control units, audio players (such as an MP3 player), digital cameras, and video game players.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A hand-held device including:
    a split touch sensitive input surface comprising:
        a first touch sensitive array including a position sensor adapted for detecting a relative position of a first pointer device located on an exterior side interface surface of the hand-held device; and
        a second touch sensitive array separate from the first touch sensitive array, and commonly located on the same exterior side interface surface of the hand-held device with the first touch sensitive array, the second touch sensitive array including a position sensor adapted for detecting a relative position of a second pointer device; and
    a display visible from an exterior surface of the device, which is different from the exterior side interface surface where the first touch sensitive array and the second touch sensitive array are located;

wherein the current relative position of an end of a respective pointer interacting with each of the first touch sensitive array and the second touch sensitive array are illustrated on respective display areas of the display by a display controller coupled to the first touch sensitive array, the second touch sensitive array, and the display; and wherein a portion of each of the respective display areas of the display overlap, thereby creating a virtual overlapping zone of interaction, that does not correspond to any actual overlapping of the first touch sensitive array relative to the second touch sensitive array but that is commonly accessible through an interaction a portion of each of the first touch sensitive array and the second touch sensitive array.

2. A hand-held device in accordance with claim 1, wherein the common exterior interface surface where the first touch sensitive array and the second touch sensitive array are located is on the opposite side of the exterior surface of the device from which the display is visible.

3. A hand-held device in accordance with claim 2, wherein the first touch sensitive array has a first edge positioned proximate a right side edge of the hand-held device, the right side edge being adapted to be gripped by a right hand of a user.

4. A hand-held device in accordance with claim 3, wherein the first touch sensitive array has a second edge opposite the first edge that is positioned away from the right side edge of the hand-held device toward the center of the common exterior surface.

5. A hand-held device in accordance with claim 3, wherein the first pointer device is a finger of the right hand of the user adapted to grip the right side edge of the hand-held device.

6. A hand-held device in accordance with claim 1, wherein the relative position of the first pointer device and the second pointer device illustrated on the display is adapted to enable the user to interact with elements illustrated on the display.

7. A hand-held device in accordance with claim 1, wherein the second touch sensitive array has a first edge positioned proximate a left side edge of the hand-held device, the left side edge being adapted to be gripped by a left hand of a user.

8. A hand-held device in accordance with claim 7, wherein the second touch sensitive array has a second edge opposite the first edge that is positioned away from the left side edge of the hand-held device toward the center of the common exterior surface.

9. A hand-held device in accordance with claim 7, wherein the second pointer device is a finger of the left hand of the user adapted to grip the left side edge of the hand-held device.

10. A hand-held device in accordance with claim 1, wherein the hand-held device is a radio telephone.

11. A hand-held device in accordance with claim 1, wherein the first touch sensitive array and the second touch sensitive array are adapted to simultaneously detect the relative position of the respective first pointer device and the second pointer device.

12. A hand-held device in accordance with claim 1, wherein each of the first touch sensitive array and the second touch sensitive array includes a plurality of detectable positions along the exterior side interface surface in each of a first direction and a second direction, where the second direction is substantially orthogonal to the first direction.

13. A split touch sensitive input surface comprising:
a first touch sensitive array including a position sensor adapted for detecting a relative position of a first pointer device; and
a second touch sensitive array separate from the first touch sensitive array, and located on a common side with the first touch sensitive array, the second touch sensitive array including a position sensor adapted for detecting a relative position of a second pointer device; and
wherein at least one of the first touch sensitive array or the second touch sensitive array includes a force sensor adapted for detecting the relative force the corresponding one of the first pointer device or the second pointer device is engaging the respective touch sensitive array.

14. A hand-held device comprising:
a split touch sensitive input surface coupled to the controller including
a first touch sensitive array including a position sensor adapted for detecting a relative position of a first pointer device, and
a second touch sensitive array separate from the first touch sensitive array, and located on a common side with the first touch sensitive array, the second touch sensitive array including a position sensor adapted for detecting a relative position of a second pointer device;
a display visible from an exterior surface of the device, which is different from the exterior side interface surface where the first touch sensitive array and the second touch sensitive array are located;
wherein the current relative position of an end of a respective pointer interacting with each of the first touch sensitive array and the second touch sensitive array are illustrated on respective display areas of the display by a display controller coupled to the first touch sensitive array, the second touch sensitive array, and the display; and
wherein a boundary of each of the respective display areas corresponding to each of the first touch sensitive array and the second touch sensitive array can be separately mapped and adjusted to a particular portion of the display, and can have a different scaling factor.

15. A hand-held device in accordance with claim 14, wherein during the operation of the hand-held device a controller is adapted to change the boundary of the respective display area corresponding to each of the first touch sensitive array and the second touch sensitive array.

16. A hand-held device in accordance with claim 15, wherein when the boundary of the respective display area is changed, the controller is adapted to adjust the scaling of the translated movement of a pointer on the first touch sensitive array and the second touch sensitive array, and the relative movement mapped to the respective display area.

17. A hand-held device in accordance with claim 14, wherein the hand-held device is a wireless communication device additionally comprising:
an antenna;
a wireless interface circuit coupled to the antenna, the wireless interface circuit including at least one of a receiver, a transmitter or a transceiver; and
a controller coupled to the wireless interface circuit.

* * * * *